US008749345B2

(12) United States Patent
Thompson (10) Patent No.: US 8,749,345 B2
(45) Date of Patent: Jun. 10, 2014

(54) SECURITY AUTHORIZATION SYSTEM (76) Inventor: Milton Thompson, County Wexford (IE)

( * ) Notice: Subject to any disclaimer, the term of this patent is extended or adjusted under 35 U.S.C. 154(b) by 1629 days.

(21) Appl. No.: 10/550,821

(22) PCT Filed: Mar. 24, 2004

(86) PCT No.: PCT/GB2004/001274
§ 371 (c)(1),
(2), (4) Date: Aug. 11, 2006

(87) PCT Pub. No.: WO2004/085213
PCT Pub. Date: Oct. 7, 2004

(65) Prior Publication Data
US 2006/0273885 A1    Dec. 7, 2006

(30) Foreign Application Priority Data

Mar. 25, 2003 (IE) .................................... 2003/0219
Sep. 24, 2003 (GB) .................................... 0322314.6

(51) Int. Cl.
*B60R 25/00*    (2013.01)
(52) U.S. Cl.
USPC .................. 340/5.72; 340/5.64; 340/426.12; 307/10.2
(58) Field of Classification Search
USPC .................. 340/5.72, 5.64, 426.12; 307/10.2
See application file for complete search history.

(56) References Cited

U.S. PATENT DOCUMENTS

| 5,444,430 | A | | 8/1995 | McShane |
| 5,583,486 | A | * | 12/1996 | Kersten ...................... 340/572.1 |
| 5,804,810 | A | * | 9/1998 | Woolley et al. ............... 235/492 |
| 5,838,074 | A | * | 11/1998 | Loeffler et al. .............. 340/5.61 |
| 5,986,543 | A | * | 11/1999 | Johnson ................... 340/426.19 |
| 6,400,042 | B1 | * | 6/2002 | Winner et al. ............... 307/10.5 |
| 6,522,027 | B1 | * | 2/2003 | Morillon et al. ............. 307/10.3 |
| 6,611,789 | B1 | * | 8/2003 | Darley .......................... 702/160 |
| 6,700,488 | B1 | * | 3/2004 | Leyden et al. ............. 340/568.1 |
| 6,718,240 | B1 | * | 4/2004 | Suda et al. ...................... 701/36 |

(Continued)

FOREIGN PATENT DOCUMENTS

| EP | 1 127 757 | | 8/2001 |
| GB | 2359890 A | * | 9/2001 |

OTHER PUBLICATIONS

International Search Report (4 pages).
Derwent English Abstract for EP 1 239 420 (1 page).

(Continued)

*Primary Examiner* — George Bugg
*Assistant Examiner* — Naomi Small
(74) *Attorney, Agent, or Firm* — McCormick, Paulding & Huber LLP (57) ABSTRACT

An authorization system for permitting an apparatus to function normally in the presence of an authorized user includes complementary apparatus and user parts of a wireless communication device, which communicate within a spatial envelope defining a permissible working relationship and communication link for authorizing normal functioning of the apparatus. The system responds to interruption of the communications link with the apparatus inhibited from normal functioning after a delay, as measured in time or distance, that permits a separation to be established between the user and the apparatus, so that if the apparatus is forcibly taken from the authorized user, the user's safety is not jeopardized by the proximity of the non-functional apparatus. Inhibition of functionality may include a vehicle, or any apparatus, becoming immobile or constrained as to maximum operating speed.

28 Claims, 7 Drawing Sheets

(56) References Cited

U.S. PATENT DOCUMENTS

| | | | |
|---|---|---|---|
| 6,771,168 B1* | 8/2004 | Nguyen | 340/426.17 |
| 6,970,679 B2* | 11/2005 | Blatz et al. | 455/41.1 |
| 2001/0011941 A1* | 8/2001 | King et al. | 340/5.64 |
| 2001/0019598 A1* | 9/2001 | Pyles | 377/5 |
| 2003/0083044 A1* | 5/2003 | Schreyer et al. | 455/411 |
| 2003/0179076 A1* | 9/2003 | Underdahl | 340/5.64 |

OTHER PUBLICATIONS

Derwent English Abstract for FR 2 768 676 (1 page).
Delphion English Abstract for WO/02072395A2 (which is a country equivilent of FR 2 821 809) (2 pages).

* cited by examiner

SECURITY AUTHORIZATION SYSTEM

This invention relates to security systems and particularly to confining correct operation of functional apparatus to the presence of an authorized user and more particularly to disabling functioning apparatus separated from the authorized user.

The invention is concerned with apparatus which functions under the direct control of an operator as, or on behalf of an authorized user and in this respect, as least for convenience in discussion of the background to the invention, a suitably authorized operator and an authorized user are considered synonymous, although they need not be.

The invention is concerned particularly, but not exclusively, with functional apparatus which is moveable insofar as the apparatus or a constituent thereof can be removed to a place unknown to the authorized user. It concerns apparatus which is physically in the possession of the authorized user, carried thereby (such as a cellular telephone or a computing device) or vice versa (such as a motor vehicle), and apparatus function-controlling devices, conveniently herein called "key devices", which themselves may constitute functional apparatus with a limited degree of functionality required to initiate operation of apparatus, and which apparatus or devices may nevertheless be snatched from the authorized user as a criminal act predicated upon the element of surprise and/or menace, where the speed by which the authorized user, or victim, is deprived thereof renders the criminal less likely to be identifiable and/or the victim less likely to resist and increase the seriousness of the crime with personal violence.

The invention is particularly concerned with moveable apparatus in the form of a motor vehicle in which a driver forms the operator, and which because of its value and/or utility to a criminal is an attractive target. Although many vehicles have sophisticated entry- and function-authorizing systems which deny entry to, and/or initiating functioning of, the vehicle to any potential operator without the correct key devices, and patent specification number GB-A-2342742 exemplifies the level of the measures proposed to prevent circumventing use of the correct key devices, the situation still exists whereby the person in possession of these key devices is de facto the authorized user.

Because of such sophistication, it has become commonplace for vehicle thieves to avoid attempting to by-pass entry-denial and ignition-denial systems, instead stealing genuine key devices from the premises of the genuine holder using standard burglary or sneak-thief techniques that avoid contact with the holder, or by robbery, snatching the key devices from the person of the genuine holder within such premises or as the holder transits between the premises and the vehicle.

It is also known to replace or supplement such physically held key devices by some form of personal code which the authorized operator enters into vehicles by a key pad or the like which ostensibly mitigates any benefit to a criminal simply taking possession of the key devices, but it is believed by some that such a feature may in practise practice put both the possessor of the code and robber in increased personal danger by confrontation to effect forced divulgence.

However, having regard to the fact that many operators now transit between vehicles and premises in places not readily accessible to criminals, unattended theft is becoming more unattractive and it is becoming more prevalent for criminals to snatch a fully-functioning vehicle when it is brought to a halt by a traffic sign, signal or obstruction and forcing a surprised and disorientated driver to leave the functioning vehicle which is ready to be driven away. Such crime is frequently referred to as "hijacking" or "carjacking", and the terms are used herein in this context.

Proposals have been made to address the problem of authorized driving way of a vehicle as a result of unattended theft or hijacking. P.C.T. Publication No. WO 01/32479 describes a system including a cellular phone arrangement whereby in addition to notifying the authorized operator that an unattended alarm condition has been recognized, it also permits the authorized operative, if in possession of a phone, to disable the vehicle remotely; such a system would apparently permit the victim of a hijacking also to remotely disable the taken vehicle. In a similar manner, U.S. Pat. No. 6,206,130 describes a hand-held security system transmitting device by which the authorized operator may actively enable or disable functioning of the vehicle remotely, although it must be operated while the vehicle is in the vicinity. However, in both of the above, a positive action is required in the part of the authorized operator and in the circumstances of a hijacking this may not occur to a disorientated victim until it is too late to take appropriate action. Furthermore, it is likely that a hijacker would force a victim to hand over a phone device or other apparent vehicle-specific device to delay reporting of the incident to the authorities.

U.S. Pat. No. 5,494,130 also addresses the problem of vehicle hijacking by having built into the vehicle a driver's seat switch to detect the driver leaving the seat of a functioning vehicle and therefrom initiating a delayed immobilization of the vehicle such that an unsuspecting hijacker creates a separation in space and time from the victim/authorized operator before the vehicle is fully immobilized. However, insofar as such system may be known by a potential hijacker to exist in a particular model of vehicle or be ascertained by inspection, such potential hijacker may learn to effect driver transfer without disturbing the switch and/or put the authorized driver at risk of greater harm by abducting him and forcing him to drive to a place where such transfer can be affected or the authorized driver forced to part with the details for cancelling immobilization.

As indicated above, such hijacking or vehicle snatching is one example of separating an authorized user of functioning apparatus from the apparatus and in order to benefit from its functioning. Another is a portable electronic appliance such as a computer, communications device, entertainment device or the like that may be taken from the custody of an operator when the operator's attention is diverted or even from the person of the operator.

It is an object of the present invention to provide an authorization system for preventing function of apparatus removed from the presence of an authorized user that is versatile and readily implemented and less compromising to the user's safety than systems known hitherto.

According the present invention an authorization system, for permitting apparatus functional under the control of an operator to function normally only in the presence of an authorized user, comprises complementary parts of wireless communication means arranged to be carried in operation by the apparatus and an authorized user of the apparatus and operable to effect, within a spatial envelope defining a predetermined permissible working relationship between the authorized user and the apparatus, a communication link defined by continual transfer, with reference to a temporal envelope, of identifying information pairing the authorized user and the apparatus, said communication means being responsive to existence of said link to effect authorization of the apparatus permitting it to function normally under said operator control and to cessation of an existing link to functioning apparatus to inhibit normal functioning of the apparatus after a delaying interval representative of extended absence of the authorized user from the apparatus.

An system according to the present invention and as defined in the preceding paragraphs may advantageously be adapted for use with moveable apparatus susceptible to being taken from the possession of the authorized user whilst functioning, and wherein the delaying interval is chosen having regard to the nature and movability of the apparatus to permit a taker of the apparatus to become separated from the authorized user by a distance sufficient to ensure the safety of the authorized user.

Some apparatus, such as electrical devices which do not usually record change of position or distance moved, and the apparatus or the authorization system would normally be constructed to measure time and the delaying interval be a function of time only. However, this and other apparatus, such as a road vehicle, may be equipped to measure distance travelled and the delaying interval may be determined as a function of distance travelled after separation or from a combination of time and distance. Thus, the apparatus or the communication means may include means for measuring distance travelled and the communication means is operable to affect the delaying interval as a function of distance travelled by the apparatus.

Whereas a road vehicle is inherently equipped to measure distance travelled other apparatus that is capable of being moved from the authorized user, particularly carried away, may include acceleration responsive means carried by the apparatus or the communication means and responsive to movement of the apparatus or communication means to effect a determination of distance travelled by the apparatus at least during the delaying interval.

In the case of moveable apparatus capable of being carried by, and susceptible of being taken from the possession of, the authorized user, the acceleration responsive means may comprise pedometer mans operable to recognize movement steps of the carrier of the apparatus and to compute from a number of recognized steps at least an approximate distance travelled by the apparatus. Furthermore, such pedometer means may include calibration means arranged to calibrate the pedometer to the stride pattern of the authorized user and the apparatus includes means to provide to the authorized user on demand distance travelled by apparatus carried by the authorized user during normal functioning of the apparatus.

Where the apparatus is a vehicle that moves according to a speed function relating time and distance, the function inhibiting delaying interval of such apparatus may be set according to speeds reached and at least one of time and distance of travel of the apparatus.

For instance, where the delaying interval is related to distance, it may be a distance that is predetermined and fixed, or a distance selected according to a predetermined operating scenario, such as "rural" where a large separation may be achieved in a short time and "urban" where only a short separation may be achieved in a short time, or a distance chosen according to particular operating conditions prevailing prior to the separation. Where a simple distance of separation is employed for a vehicle a distance of at least 0.5 mile (0.8 Km) is preferred.

Where a simple time delay is employed, the time delay is preferably at least 15 seconds and may be in the range 30 seconds to 5 minutes, although shorter or longer times may be used according to circumstances.

Preferably the communication means is operable in the radio frequency band. Preferably the communication means comprises user transmission means carried by the user part and apparatus reception means carried by the apparatus part, having therein means to produce an identity reference unique to the pair, the user transmission means being operable to transmit radiation modulated in accordance with said identity reference and the apparatus reception means being responsive to receipt of said modulated radiation to confirm by transfer of identifying information including said identity reference existence of a communication link between them.

The communication means may further comprise apparatus transmission means in the apparatus part and user reception means in the user part arranged to effect bi-directional communications between the apparatus part and the user part. Then, the user and apparatus parts may each have therein means to produce a further identity reference unique to the pair, the apparatus transmission means being operable to transmit radiation modulated in accordance with said further identity reference and the user reception means being responsive to receipt of said modulated radiation to confirm existence of a communication link between them.

In any event the user reception means may be responsive to receipt of a transmission from the apparatus transmission means to enable transmission from the apparatus transmission means. Furthermore, at least the user transmission means of the user part may derive operating power from the radiation received from the apparatus transmission means.

The identity reference, and if appropriate the further identity reference, forming the basis for modulation may be based upon generation of at least one random or pseudo-random number.

Preferably said modulation of the transmitted radiation is in accordance with a digital code. Where this is so, said modulation may be in accordance with a rolling digital code changed for each transmission.

Alternatively or additionally, the communication means may be arranged to change at least the carrier frequency of the modulated radiation in accordance with a digital code during communication. Where this is radio frequency, the communication means is arranged to effect a communication link in accordance with the Bluetooth wireless specification or comparable wireless peer-to-peer networking specification.

The temporal envelope may comprise at each of sequential communication intervals a time window of predetermined duration, and the apparatus part be responsive to receipt of identifying information from the user part within each time window to provide authorization of the apparatus until the next window and be responsive to absence of identifying information to determine cessation of the communication link.

The apparatus part may be responsive to the absence of receipt of identifying information within a predetermined number of consecutive time windows to determine cessation of the communication link. The sequential communication intervals are contiguous or spaced apart. Irrespective of the relationship between communication intervals, the time window associated with each communication interval may have a duration extending between successive communication intervals.

An authorization system according to the present invention is particularly suited to permitting use of apparatus comprising a vehicle having an occupants cab and an engine and whereby normal function thereof is by an operator who is an occupant and driver; the authorization system then has the spatial envelope defined to encompass, and preferably be substantially co-extensive with, the occupants cab and the apparatus part is arranged to form a communication link with a user part carried by an occupant of the cab and to be operably coupled to the vehicle to authorize or inhibit functioning of the vehicle engine by the driver, that is, bring the vehicle to rest and inhibit it from further movement.

Insofar as such a vehicle has its engine supplied with fuel by way of a fuel delivery system, the apparatus part of the system may be arranged to be operably coupled to the vehicle to or inhibit delivery of fuel to the engine. Additionally or alternatively, it may be operable to effect said inhibition of normal functioning after a said delaying interval by progressively reducing the delivery of fuel to the engine during said delaying interval.

Insofar as an authorization system according to the invention is not limited to specific apparatus, and sudden failure of the apparatus may arouse suspicion, the apparatus part may be operable in the delaying interval to effect temporary or permanent inhibition of multiple functional aspects of the apparatus to disguise responsibility of any particular functional aspect for non-functioning of the apparatus.

Inhibition of normal functioning comprising a complete cessation of operability, in the case of a vehicle bringing it to rest, may be considered to present an unacceptable safety hazard for other road users. As an alternative, the authorization system may authorize the vehicle to travel at any speed demanded by the driver or to inhibit the vehicle from travelling in excess of a speed set by the system at the end of the delaying interval. The speed may be predetermined or the system may have the apparatus or communication means part include means for deriving a speed function related to any speed achieved during the delaying interval and at the end of the delaying interval to inhibit the vehicle from exceeding a speed that is a fraction of any speed represented by said speed function If the authorization system is employed for apparatus having a telephone communication ability, the apparatus part may be operable during said delaying interval to effect a telephone call to a predetermined recipient.

When the authorization system is adapted for use with apparatus such as the aforementioned vehicle in which operation of the apparatus is initiated by the operator prior to effecting control of functioning thereof, the apparatus part may be responsive to initiation of operation of the apparatus by the operator to initiate establishment of the communication link prior to, or contemporaneously with, functioning of the apparatus. The apparatus part of the authorization system may be arranged to be carried by the apparatus in functioning but removable when it is not intended to function and in such circumstances may include apparatus operation initiation means operable to permit initial operation of the apparatus.

An authorization system according to the invention may have the communication means include a relay part arranged to be disposed, in respect of the communication link, between the user part and apparatus part and wherein at least the user part is arranged to transfer identifying information by way of the relay part in preference to establishing a communication link with the apparatus part directly. The communication means may be arranged to attempt to establish a communication link including the relay part and in absence thereof to establish a communication like directly between the user part and the apparatus part.

The relay part is arranged to be carried by the user in operation, and it may include, or be included in, additional functional apparatus under the control of the authorized user and the relay part is arranged to effect, in response to cessation of an existing communication link with the user part of the communication means during functioning of the additional apparatus, inhibition of normal functioning after a delaying interval.

Embodiments of the invention will now be described with reference to the accompanying drawings, in which.

Figure 1A:
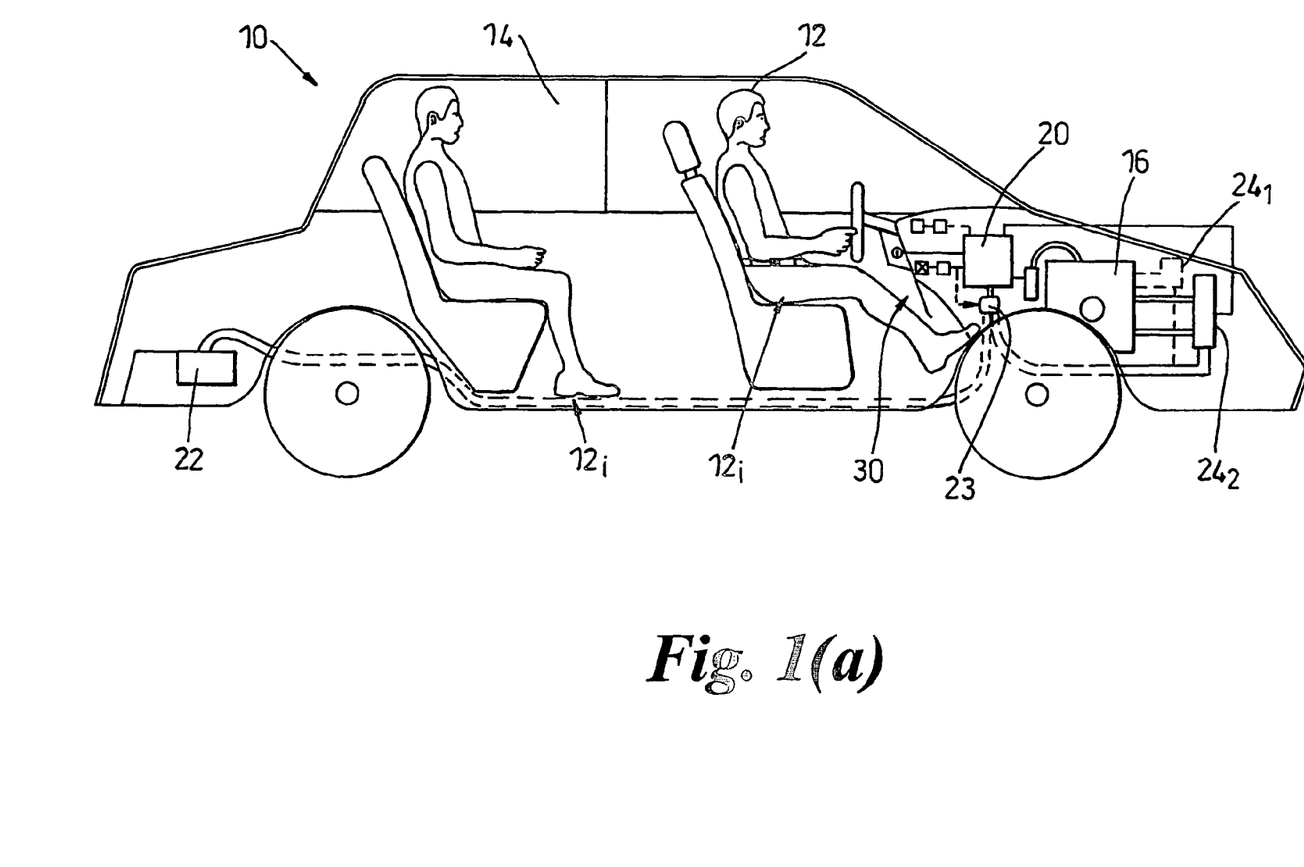
FIG. 1(a) is a sectional elevation through a road vehicle having an engine and occupant cab and operated by a driver occupant, and illustrating in schematic form an authorization system in accordance with the present invention.

Referring to FIG. 1 (a) a vehicle 10 comprises apparatus which functions normally, that is, in respect of performing those functions normally required of it, under the control of an operator 12 who is more conventionally called the driver. The vehicle is moveable and includes a cab 14 which typically has seats for a plurality of occupants 12.sub.i including the driver. Whereas for normal functions the vehicle is under the direct control of the driver, the functioning of the vehicle may be authorized by any user of the vehicle occupying of the cab, that is, the driver or another occupant sub-authorizing the driver.

The vehicle is not described in any more detail than is necessary to explain the invention and typically includes an engine shown at 16 which is controlled by the driver in respect of initiating its operation and changing performance functions, optionally in conjunction with an electronic engine management unit (EMU) 20.

The engine 16 is powered by liquid fuel delivered to the engine from a storage tank 22 by way of a fuel delivery system including electrically operated supply pump 23 and fuel distribution and input means 24, which may comprise a carburettor (as shown ghosted at $24_1$) that includes a small storage chamber for fuel, or, more conventionally in modern gasoline engines and in compression ignition (diesel) engines, a plurality of fuel injection pumps and valves $24_2$. Other features of the vehicle, as they relate to its operation are shown by the enlargement of the circled region, in FIG. 1(b).

Figure 1B:
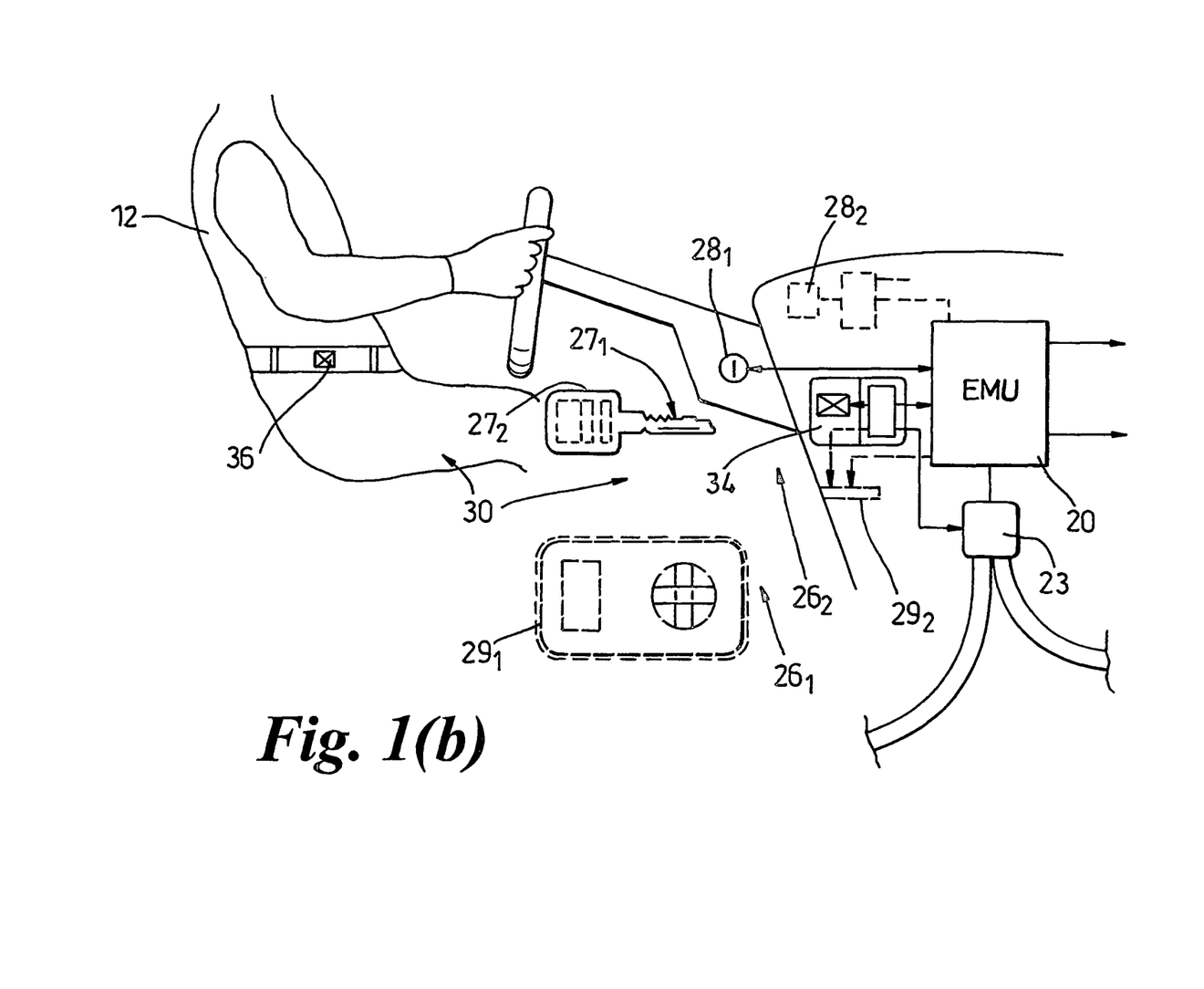
FIG. 1(b) is an enlarged view of the ringed portion of FIG. 1(a) showing in greater detail a physical layout of the authorization system having communication means comprising a user part carried by the authorized user and apparatus part carried by the vehicle and interfacing with engine operating components.

To complete the overview of the vehicle as apparatus under the direct control of an operator-driver, such operator effects operation by initiating functioning of both the vehicle chassis and of the engine by which the vehicle moves. Initiation of operation usually is effected by inserting a key device 26.sub.1 into a co-operable lock 26.sub.2 which releases a steering lock (not shown) and authorizes the EMU 20 to enable the engine to be started and the supply pump 23 to deliver fuel for the engine. The key device $26_1$ may take the form of a physical key $27_1$ paired with a lock $28_1$ fitted to the vehicle and optionally carry in the key radio frequency transducing means $27_2$, paired with transceiver $28_2$ in the vehicle. In the manner disclosed inter alia in GB-A-2342742 the transceiving means is arranged to program the key in use, issuing it with a code to be transmitted upon next usage so that only if the codes agree does the key function to initiate operation of the engine, and for practical purposes making it virtually impossible to start the engine without permission of the genuine or authorized key. An alternative key device, as shown ghosted at $29_1$, employs a key-card of flexible plastics material and carrying thereon authorizing means, in the form of a magnetic strip or a semi-conductor integrated circuit including a processor and memory and often known to as a smart-card, which is able to co-operate with a reader $29_2$ fitted to the vehicle. Such a card-key is able to store a larger number of parameters vital to initiating operation of the engine, and may also be re-programmed from usage-to-usage, but nevertheless serves as a key device to effect initiation of vehicle engine operation by virtue of being in the possession of the user at start-up and in position in the vehicle thereafter.

As outlined above, such in-situ programming of the primary engine initiating device (key, key-card) is intended to make it difficult for an unauthorized user to tamper with the vehicle, particularly the EMU in order to start the engine and steal the vehicle, or as additional anti-theft devices which respond to an attempt at unauthorized entry into the vehicle cab or engine bay or even disturbance of the vehicle itself to trigger an alarm.

Known arrangements for ensuring that the vehicle, through its engine, functions normally only for the driver in possession of the appropriate key device, have the effect, as discussed above, of treating the possessor of the key device as the authorized user and it leads to the situation where a criminal is tempted to steal the appropriate key device for the vehicle, and further encouraged to ensure the key device is correctly authorized by separating the key device from the owner at a time when the owner is in the vicinity of the vehicle, or has it fully functioning in the process of being driven; that is, hijacking.

In accordance with the present invention there is introduced an authorization system, indicated generally at 30, with the intention of permitting functioning of the vehicle normally under driver control only in the actual presence of an authorized user, rather than merely the presence of the normal key devices which hitherto has constituted de-facto authorization. In this embodiment an authorized user may be any occupant $12_i$ of the vehicle cab, conveniently, but not necessarily, the driver 12, and presence is that defined by presence within or immediately adjacent the vehicle cab.

In general terms, the authorization system comprises wireless communication means 32 having complementary parts 34 and 36 arranged to be carried in operation by the apparatus (the vehicle) and a said authorized user of the apparatus (here shown as driver 12) respectively. The parts may communicate by any suitable contactless system, such as optically or ultrasonically, but preferably operate at radio frequencies and preferably at those in the GHz or microwave bands.

The parts of the communication means, conveniently referred to as the "apparatus" or "apparatus-carried" part 34, and "user" or "user-carried" part 36, are arranged to effect, within the spatial envelope of the cab that defines a permissible working relationship between the authorized user and apparatus (vehicle), a communication link defined by continual transfer of identifying information pairing the authorized user and the apparatus. The identifying information is described further below as is the nature of continual transfer, being with respect to a temporal envelope which supplements the spatial envelope defining permissible separation of the parts.

The communication means 32 is responsive to the existence of said link that confirms the "presence" of the authorized user to effect authorization of the vehicle, permitting it to function normally under control of a driver-operator in possession of the appropriate key device, but to deny authorisation when not present, preventing a driver who is not the authorized user from using the key device obtaining or maintaining functioning of the engine of the vehicle.

Initiation of operation of the vehicle may be effected separately from, or contingent upon, such communication link, but most importantly, the communication means is responsive to cessation of an existing communication link with previously authorized said functioning apparatus to inhibit the normal functioning of the apparatus after a delaying interval that is characteristic of the authorized user and vehicle as having moved apart. In this embodiment the delaying interval is a time delay of duration in excess of 0.5 minutes and may typically be of the order of 5 minutes, although other time delays, may be set according to anticipated or actual conditions pertaining.

This embodiment is particularly concerned with, and adapted for, an above-discussed hijack situation wherein the fully functioning vehicle, containing the authorized user and driver, is halted and the occupant or occupants forced to leave, and possibly compounded by the hijacker then removing from the erstwhile occupants any cellular telephone or comparable communication devices by which the authorities may be alerted before driving away in the otherwise functioning vehicle.

To this end, the user part 36 of the communication means 32 is arranged to be worn inconspicuously or secreted about the person of the authorized user, and notwithstanding the requirement for such part to effect a radio communication link with the apparatus part, this is feasible having regard to the relatively small spatial envelope in which a communication link has to be established with the apparatus part.

The apparatus part 34 may be permanently fixed with respect to the vehicle to control its engine operation or fixed with respect to, or form part of, an operating key device, such as key $27_1$ or key card $29_1$, which is, in operation, carried by the vehicle and without which device it will not function.

In normal use of the vehicle, that is, absent any hijacking situation, the authorized user, carrying the user part of the communication means, upon entering the spatial envelope defined substantially by the vehicle cab creates the circumstances whereby the communication means may form a communication link between the user-part and apparatus part, which link is considered maintained by the continual transfer of identifying information pairing the authorized user and vehicle to the apparatus part. The communication means may exist because of permanent or prior empowerment of the relevant part or parts, or may result from empowerment arising from the driver using the appropriate key device to initiate functioning of the engine.

Notwithstanding various options discussed below, by combination of a function-authorized wireless communication link and key device—enabled operation of the vehicle engine, the vehicle is set to function normally without any additional overt actions necessary on the part of the authorized user, other than his presence. Insofar as the communication link between apparatus and user parts and initiating operational functioning of the vehicle are closely bound, they may be combined or kept totally separate. The apparatus and/or user parts may begin to transmit upon disarming of an anti-theft device that permits the authorized user to enter the cab. Subsequent initiation of engine operation is contingent upon establishment of the communication link. Alternatively, the apparatus part may be caused to function when operation of the vehicle ignition is initiated by the normal key devices but before the engine starts, the completion of operating engine function being contingent upon the establishment of a communication link during the procedure. Yet an alternative method is to permit the engine to function by the normal key devices but with the apparatus part arranged to initiate inhibition if a communication link is not established within a relatively short time delay that is insufficient for the driver to move the vehicle to a place of danger before functioning ceases.

As an alternative configuration, the user part may be connectable physically with the vehicle and/or the apparatus part in order to interchange stored values of identifying codes and establish the communication link and/or to permit initiation of engine function which is maintained after the user part is removed and returned to the person of the authorized user to be carried thereabout.

Thus, in such a hijack situation, and depending upon how precisely the spatial envelope of the communication link between the user part and the apparatus part is defined, upon the authorised user leaving the vehicle cab and the vicinity of the vehicle (distancing himself therefrom or having the vehicle drive away) there is a cessation of the authorization communication link to the functioning vehicle.

The apparatus part 34 of the communication means is functionally connected to the vehicle, to cause the vehicle to stop functioning after a time delay of such duration as to permit the hijacker to become separated from the authorized user. The time delay as used in this embodiment not only permits the hijacker to move the vehicle from the hijack scene for a distance that is intended to be too great to justify returning to confront the authorized user but also an opportunity for the authorized user to leave the hijack scene. The vehicle is stopped from functioning at the appropriate time either by affecting the operation of one or more components of the vehicle that causes the vehicle (engine or chassis) to stop suddenly or by modifying operation of one or more components so that functionality is removed from the vehicle more gradually over at least part of the delay interval. The engine may also be caused to stop functioning by effecting temporary, intermittent inhibition of multiple functional aspects of the vehicle to disguise from the hijacker responsibility of any particular functional aspect for non-functioning of the vehicle, and thus thwarting by-passing of the control for that functional aspect.

There may be in existence in any particular country or state for a particular apparatus, such as the passenger vehicle, a regulatory or industry body that sets approval standards to be met to obtain the approval or certification by that body. In the UK a common certification standard for vehicle immobilisation requires that at least three separate functional components, each by itself capable of halting operation of the vehicle, have their operation inhibited at the same time to constitute vehicle immobilisation. Thus various electrically powered components, such as fuel pump, EMU and general battery power supply may be inhibited during or after the delay interval to effect certificated immobilisation of the vehicle.

On the assumption that the authorized user will eventually be re-united with a non-functioning vehicle abandoned by a hijacker, the communication means may be arranged to respond to a resumed presence of the user part to re-establish the communication link that returns full functionality to the vehicle, but preferably the apparatus part is arranged to lock the inhibition of vehicle functionality at least until some positive action is taken to remove the inhibition. A vehicle would have its functionality locked out on a temporary basis, to be overcome by locally or remotely controlled re-setting switch means, but other apparatus, depending largely upon the structural form of the apparatus part, may have its functionality locked on a temporary or permanent basis. user will eventually be re-united with a non-functioning vehicle abandoned by a hijacker, the communication means may be arranged to respond to a resumed presence of the user part to re-establish the communication link that returns full functionality to the vehicle, but preferably the apparatus part is arranged to lock the inhibition of vehicle functionality at least until some positive action is taken to remove the inhibition. A vehicle would have its functionality locked out on a temporary basis, to be overcome by locally or remotely controlled re-setting switch means, but other apparatus, depending largely upon the structural form of the apparatus part, may have its functionality locked on a temporary or permanent basis.

For instance, if the apparatus part is of the removable key-card type, locking out of vehicle functionality may comprise permanently destroying information or functioning of the card. A programmable key device that locks-out upon cessation of the communication link may be re-programmed to overcome temporary loss of functionality.

The apparatus part of the communication means may also include authorized disablement means to override the authorization system when the vehicle is in the care of trusted non-authorized users, conveniently associated with such re-setting means or as a replacement "master key" device.

It will be appreciated from above that there are a number of ways in which the communication link may be established and its cessation determined.

Figure 2:
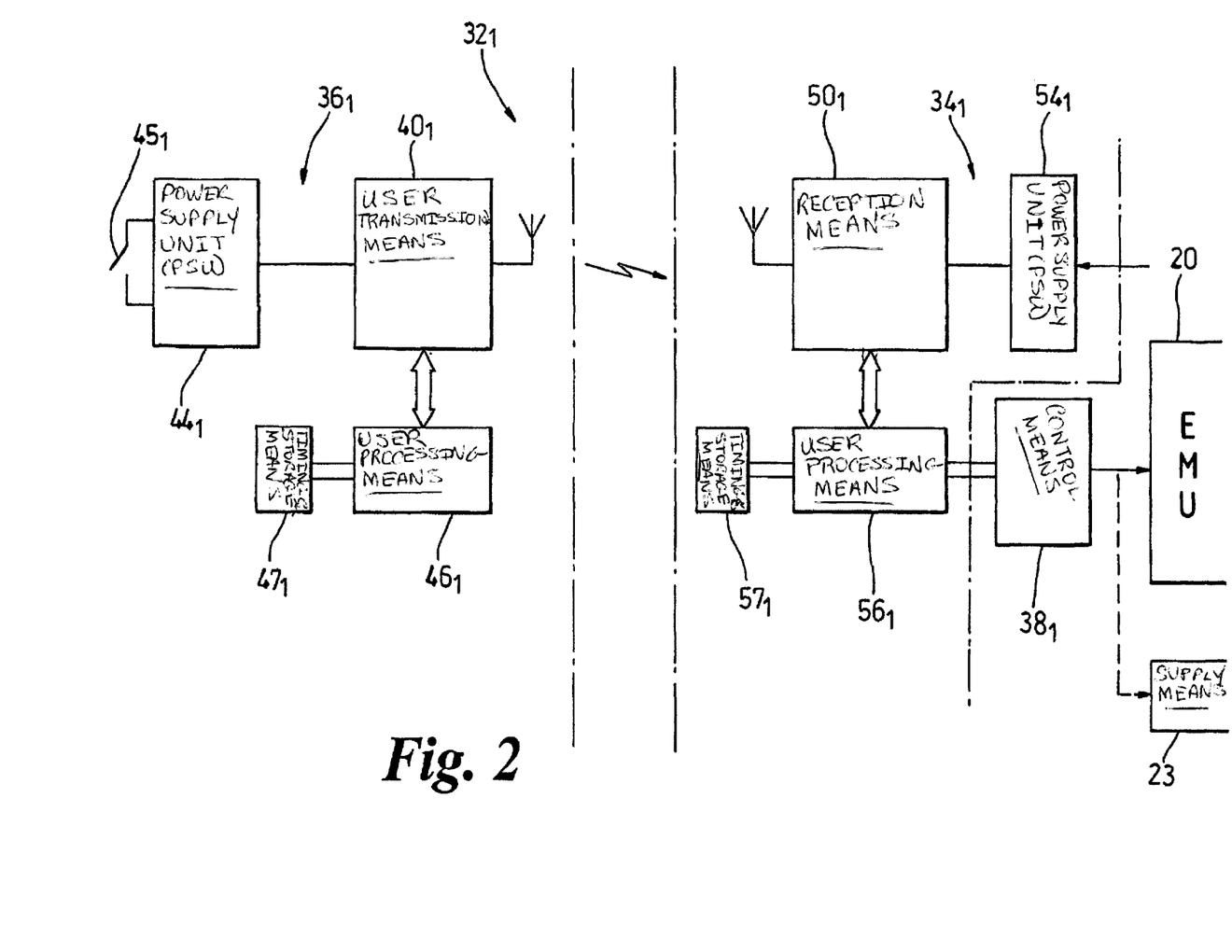
FIG. 2 is a schematic block circuit diagram of a first form of authorization system in accordance with the present invention incorporating uni-directional transmission from the user part to the apparatus part to effect a communication link between them.

Referring now to FIG. 2 which shows in schematic, block diagram form a first embodiment of communication means at $32_1$ the comprises apparatus and user parts $34_1$ and $36_1$ respectively and control means $38_1$ coupled to the engine functioning components 20 and/or 23.

The user part $36_1$ includes user transmission means $40_1$ which is operable to emit radio frequency radiation at low power in any suitable band, a power supply unit (PSU) $44_1$ comprising a self-contained primary or secondary battery and, if necessary, a manually operated power switch $45_1$ to prevent drainage of the battery when the transmission means is not in use, and user processing means $46_1$ including timing and storage means $47_1$ to produce an identity reference unique to the user part and apparatus part pair for transmission and effect transmission of radiation modulated in accordance with the identity reference. The term "modulation" as used herein is intended to include any common form of effecting variation of a radio frequency emission and is intent to include modulation in amplitude or frequency or emission per se in accordance with a digital code.

In the presently described embodiment the user processing means $46_1$ is arranged to effect transmissions at intervals, each transmission having a duration short relative to the interval.

The apparatus part $34_1$ comprises apparatus reception means $50_1$ which is operable to receive also demodulate or decode the emissions from the user transmission means, power supply unit $54_1$, which is a secondary battery arranged to be charged by connection to the vehicle supply but operable independently thereof, and apparatus processing means $56_1$ (having timing and storage means $57_1$) arranged to synchronize the apparatus reception means with respect to receiving the transmissions from the user transmission means and for recognizing the identity reference from the appropriate modulation form.

In the presently described embodiment the modulating form is a digital code produced by the user processing means and retrieved by the apparatus processing means. The apparatus processing means stores a corresponding code or the means for generating such code whereby a comparison is able to confirm or otherwise the transfer of identifying information including said identity reference, and by such transfer the existence of a communication link between them.

Existence of such communication link is notified to the control means $38_1$ which in turn authorizes functioning of the vehicle by removing a default inhibition of the EMU and/or fuel supply pump 23 that prevents vehicle function by way of the normal driver key device.

The transmitting power or directionality of the user transmission means and/or the receiving sensitivity or directionality of the apparatus reception means combine to define the spatial envelope upon which a successful communication link is based.

As discussed above, it is continuity of an established communication link that is of importance to authorize functioning of the vehicle and cessation of the established link to remove authorization in a time delayed manner, and to this end the continued existence of the link is defined not only by the dispositions of the user transmission means and apparatus reception means relative to the spatial envelope but also by transmission and reception with respect to a temporal envelope whereby transmissions are considered to be continually made and received so as to satisfy the criterion of existence of a communication link that sustains authorization, even if intermittent and discontinuous.

Figure 3A:
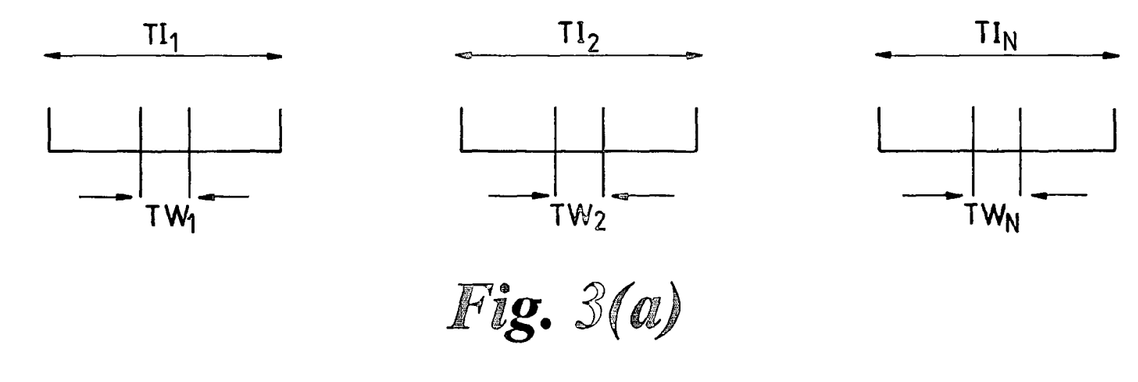
FIGS. 3(a) and 3(b) are graphical representations of transmission and reception windows defining a temporal envelope for continual transmission.

Making reference to FIG. 3(a), such temporal envelope comprises in each of a plurality of sequential time intervals, herein called communication intervals $TI_1$, $TI_2$ ... $TI_N$, ... a time window $TW_1$, $TW_2$ ... $TW_N$, ... of predetermined duration. Both user processing means $46_1$ and apparatus processing means $56_1$ define the communication intervals and the user processing means effects transmission for or within a time window in each communication interval. The apparatus processing means then determines if in each communication interval a suitably modulated transmission is received. If desired, the apparatus processing means may be further restricted to acknowledge receipt of a transmission only if it occurs within a time window pre-defined as occurring within a part of the window.

Although it is possible hypothetically to pre-define matching communication intervals and windows within the user and apparatus processing means, in practice it is difficult to keep them synchronized if they operate completely independently, and each received (and confirmed) transmission may be used to synchronise the apparatus processing means with respect to the user processing means and/or the transmitted identity reference may contain data defining the relative time to, and duration of, the next transmission.

Figure 3B:
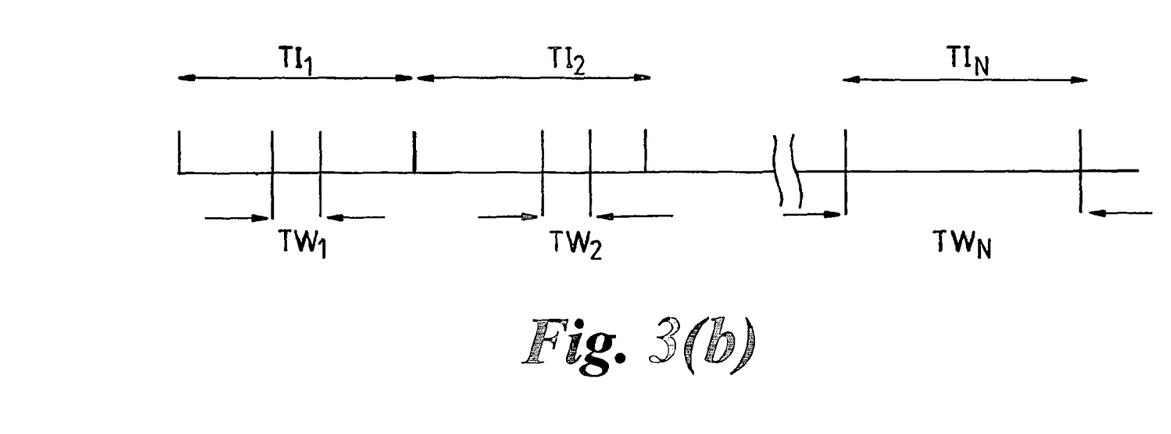

The communication intervals may be contiguous as shown in FIG. 3(b) and, if desired, the time windows in each may extend from the full interval, as shown for time window $TW_N$, creating a continuous transmission-reception situation, although such a scheme may be perceived to be wasteful of user part power reserves.

It will be appreciated that the above described communication means $32_1$, with its apparatus and user parts $34_1$ and $36_1$ has simplicity in having a single transmitter and receiver, but also some limitation, such as the need to determine in advance what the user transmission means is to transmit and when and for the apparatus reception means to be set in advance, or adapt to received transmissions, to pair therewith. Also, insofar as it is intended for the user part $36_1$ to be carried unobtrusively by the authorized user, the self-contained power supply $44_1$ is necessarily of limited capacity and notwithstanding only intermittent transmissions may require the user to effect manual switching of the part for use.

Such restrictions may be overcome wholly or in part by effecting the communication link by way of bi-directional communication between the apparatus part and the user part.

Figure 4:
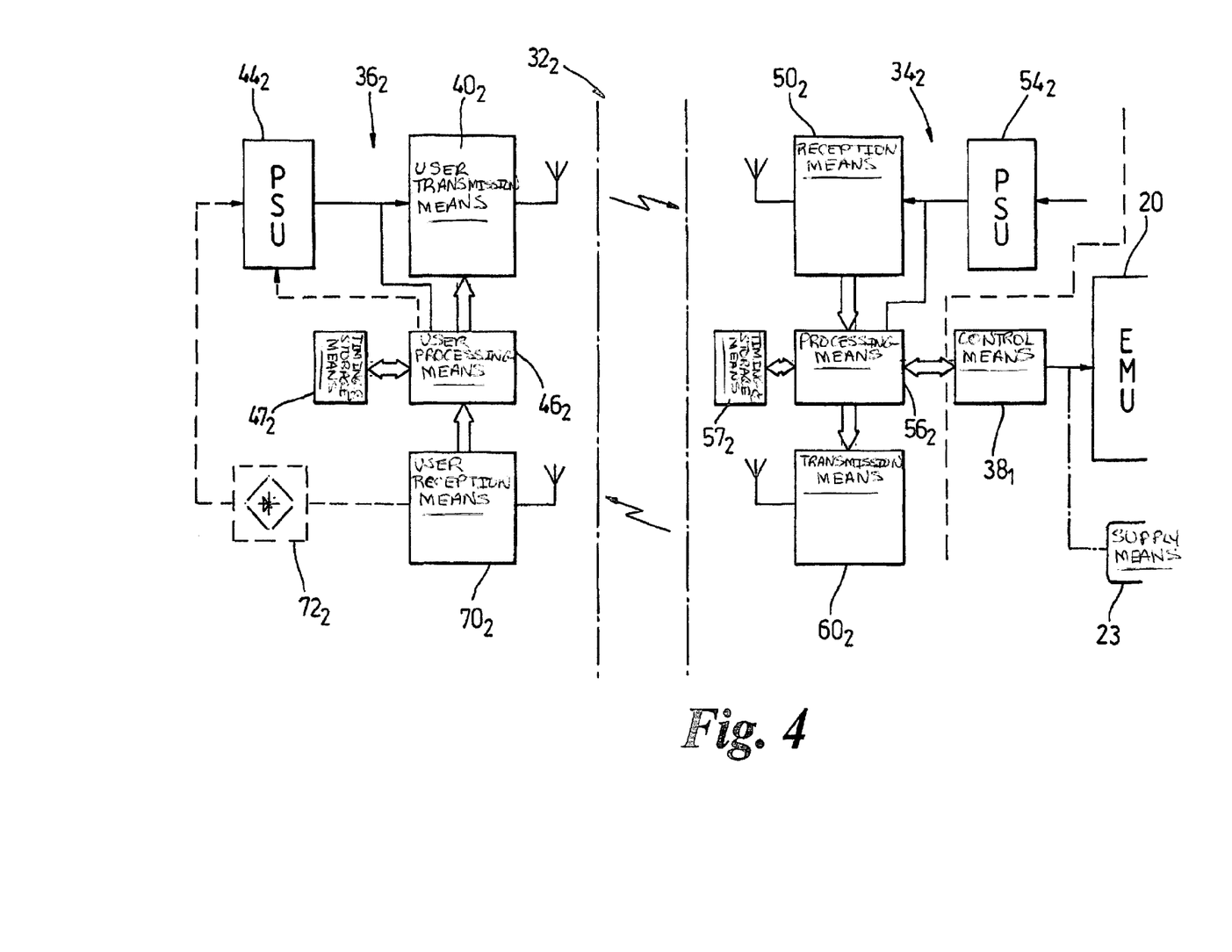
FIG. 4 is a schematic block circuit diagram of a second form of authorization system in accordance with the present invention incorporating bi-directional transmission from the user part to the apparatus part.

Referring now to FIG. 4, this shows for a second embodiment of authorization system communication means $32_2$ comprising apparatus part $34_2$ and user part $36_2$. It will be seen that the parts $34_2$ and $36_2$ are in many respects the same as the parts $34_1$ and $36_1$ and the commonly used elements will be referred to with corresponding reference numbers (other than the suffixes) and not described again unless differing in some respect. The apparatus part $34_2$ includes in association with the apparatus processing means $56_2$ apparatus transmission means $60_2$ and the user part $36_2$ includes in association with the user processing means $46_2$ user reception means $70_2$.

The communications between the parts from the apparatus part to the user part may permit several enhancements in terms of the identification information pairing them, the temporal envelope and, importantly, notwithstanding the additional components, minimising the power usage and requirements of the user part.

Transmissions from the apparatus part to the user part may contain the aforementioned identity reference, so that the user processing means only responds thereto, but preferably contains also a further identity reference which is decoded by the user processing means $46_2$ such that the user transmission means in turn transmits its next signal modulated in accordance with them both. Thus both the user processing means and the apparatus processing means have access to two identity references. In this way the identity references may be made to change constantly, as a rolling code, and notwithstanding the need for frequent transmissions to sustain the communication link.

The transmission of signals from the apparatus part to the user part also permits the latter to be arranged only to transmit when in receipt of a suitable signal from the apparatus transmission means. Thus the apparatus processing means may define the aforementioned time intervals and time windows in accordance with some pre-programmed and/or randomised regime whereby the transmission of signals from the user transmission means is always synchronised to a reception window.

Furthermore, the radio frequency energy of apparatus part transmissions may be employed by the user part $36_2$ to provide or supplement the operating power of its supply $44_2$; that is, the user reception means may include rectification means $72_2$ for a part of the signal and charge a secondary battery source or, in some instances, a capacitor (not shown) that replaces such primary or secondary battery source. Depending upon the storage capacity of the power supply $44_2$, the receipt or lack of receipt of signals from the apparatus transmission means may comprise direct control over the user part's ability to effect a response transmission. Alternatively, the user processing means $46_2$ may put the user part into a low consumption "sleep" mode until awoken by receipt of a suitably verified transmission from the apparatus part. To this end, the bi-directional arrangement may comprise the functional equivalent of the above-described unidirectional communication link in which the user part is autonomous in sending an appropriate authorization signal to the apparatus part but relies upon a signal of indeterminate form from the apparatus part to derive operating power. In general however, it is preferred to take advantage of any transmission from the apparatus part to the user part to carry information unique to the apparatus or pair that prevents empowerment of the user part by extraneous sources.

Conveniently, the identity reference modulation applied to transmissions from each of the apparatus transmission means and user transmission means comprises a digital code which is based upon one or more random or pseudo-random numbers generated within either or both of the apparatus part or user part and/or encrypted and decrypted in accordance with algorithms stored in said parts; for example, in a manner similar to that described in the aforementioned GB-A-2342742 but here applied to the radio frequency transmissions between the parts and repeated continually as defined by the temporal envelope. Thus within each time window, the apparatus part expects to receive a signal which contains an identifying reference unique to the pair, and preferably one unique to the transmission, insofar as it is based upon a number randomly or pseudo-randomly generated by the apparatus part transmitted to and modified by the user processing means for its identity reference from which the original number that can be extracted for confirmation.

Instead of, or in addition to, elaborate and encrypted codes to effect the pair identifying information, the transmission and reception parts may also be arranged during each transmission to undergo carrier frequency hopping to further lessen the chance of incorrect pairing or loss of communication link in accordance with the Bluetooth standard or a comparable radio frequency peer-to-peer networking standard. In such an arrangement, $36_1$ including apparatus transmission means and apparatus reception means, when initially empowered by initiation of operation of the vehicle engine, transmits its availability and the user part, with the user reception means and user transmission means, responds when within range to register with the apparatus part and establish a basic communication link. Registration by the apparatus part that it has established a communication link with a suitably complementary user part may be sufficient, but as such a standard for pairing items is intended to effect communication between hitherto unknown devices, preferably such link is considered established only upon transfer also of additional and unique pair identifying information.

As discussed, the apparatus part expects the receipt of an appropriate piece of identifying information within each time window and such receipt within each time window to provide authorization of the apparatus until the next window. If that information is not forthcoming, because the paired user part is not within range, as defined by the spatial envelope manifested by incorrect modulation information or insufficient received signal strength, the apparatus part, through control means 381 initiates a check for the absence of receipt of identifying information in a predetermined number of consecutive time windows to determine if it was temporary loss or permanent. If such a check confirms absence for said predetermined number of consecutive time windows, a cessation of communication link is declared to exist and delayed loss of vehicle function initiated.

The above embodiment has been described with respect o both uni-directional and the preferred bi-directional operation, but in both cases, the user part is of significant complexity insofar as it contains processing means and transmission means including control and modulation circuitry therefore.

Figure 5:
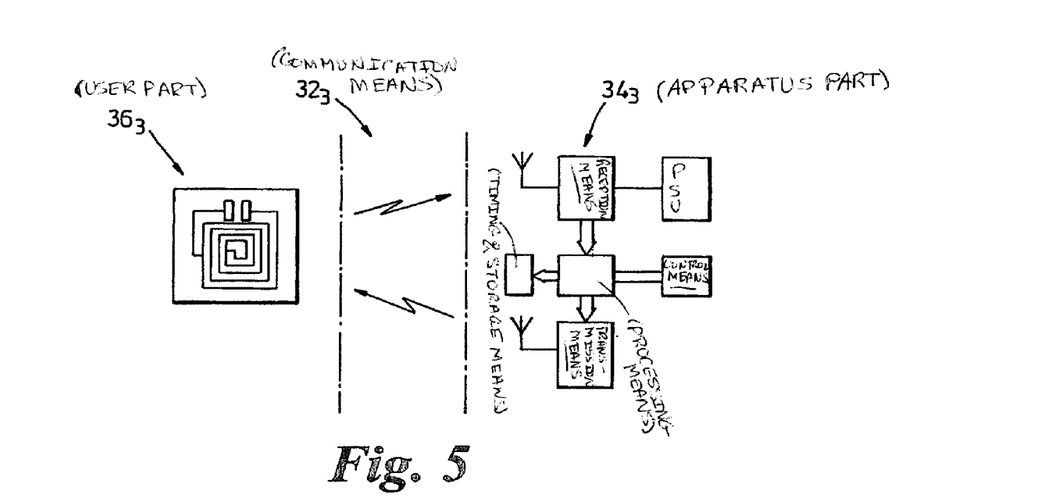
FIG. 5 is a schematic block circuit diagram of a third form of authorization system in accordance with the present invention incorporating bi-directional transmission by way of a user part having an unpowered identification tag structure.

Referring now to FIG. 5 a third embodiment of communication means $32_3$ is shown which effects a communication link between apparatus part $34_3$ and user part $36_3$ based upon bi-directional communication. The user part is in principle the same as $34_2$ but, in keeping with the aim of achieving or an unobtrusive, readily carried form empowered by radio frequency energy transmitted by the apparatus transmission means, or indeed any other suitable electromagnetic energy, comprises an analog or digital identity reference 'tag' recognised by a reader in the form of the apparatus transmission means/apparatus reception means that transmits to it continually (as herein defined) and responds as appropriate to receipt or lack of receipt of a response. Such a tag may take a simple analog form, as an inductive-capacitive (L-C) circuit tuned to a particular frequency of apparatus transmission means transmission and which effects reflection or frequency doubling of the apparatus transmission means transmission, or in a digital form in which a stored code is transmitted upon empowerment by reception of radio frequency energy from apparatus transmission means. Such digital tags are available from Microchip Technology Inc, for example as RFID model MCRF202, or Temic semiconductors as model U9280M-H.

It will be appreciated that for any apparatus part, it may be arranged to be paired with a plurality of different user parts and likewise for any user part to be paired with a plurality of different apparatus parts, and although it would be expected for the apparatus part to pair with a single user part to define a communication link by cycling through possible user parts to pair with upon initiation, the setting up of a communication link based upon intermittent transmission-reception windows makes it possible to accommodate several authorized user parts for one apparatus part simultaneously.

Notwithstanding the precise forms taken by the user and apparatus parts of the communication means in respect of effecting and determining cessation of the communication link, the system may employ other than time delay alone to effect delayed inhibition of normal functioning of the apparatus. As outlined above, a vehicle or other apparatus may measure distance and the distance measured following cessation of the communication link may be compared with a stored, predetermined value or with a value computed from the speed attained and a delay time.

For apparatus normally carried by an authorized user, and susceptible of being taken from the user, such as a cellular telephone, entertainment or computing device, that does not usually have means for measuring distance travelled, such means may be provided by the apparatus or communication means carrying acceleration responsive means that responds to continuous or periodic acceleration forces and computes therefrom a distance travelled. This may be in response to cessation of communication link and for comparison with a predetermined or otherwise computed distance that denotes the end of the delaying interval. For a vehicle, the acceleration responsive means may comprise, a linear accelerometer. For apparatus normally carried by the user the acceleration responsive means may comprise a pedometer sensor of the type that is carried by an individual and responds to the acceleration pattern of ambulating, that is, walking and/or running, coupled with user stride length, to determine how much ground has been covered by the individual walking and/or running. This may happen without the authorized user being aware of the additional feature within the apparatus. More usefully, however, the pedometer function is advertised as a feature of the protected apparatus that is normally carried by the user and incorporated into it to effect, in addition to its normal function, that of a pedometer informing the user of ambulatory behaviour behavior including also means to calibrate it according to the stride/pattern of the authorized user and providing information on demand.

Irrespectively of whether the device functions as a user-controlled, or even user-aware pedometer, it may be arranged to respond to cessation of a communication link between the apparatus and authorized user to adopt a "standard" stride pattern and monitor thereby achievement of a separation distance.

Alternatively, such determination of speed and distance may be employed to calculate a delaying interval time before inhibiting functionality.

Furthermore, both time and distance may be employed as parameters, for example, inhibition may be effected only after a time delay of, say, at least 0.5 min and a distance travelled of at least 0.8 Km (0.5 mile), the actual values being a matter of choice and dependant upon the apparatus involved.

Also, it will be appreciated that although as described above the function of the user part of the communication means is to inhibit normal functioning of the apparatus insofar as the apparatus then becomes non-functional to an extent that precludes its effective use by an authorized operator, in many cases any particular apparatus has different degrees of functionality, or functional features, not critical to normal function of the apparatus but over which it may be desired to exert control by use of the communication means.

For instance, the apparatus may be a vehicle to which a speed limit is enforced for different categories of authorized user, with possibly a minimum speed limit for an authorized user, or a computer to which certain programs are available to different categories of authorized user.

For a vehicle, for which it is determined that complete removal of functionality, that is, making it immobile, is unsuitable, the authorization system may effect control of the engine, by way of electrical ignition or fuel supply, to set a maximum speed that the vehicle cannot exceed, such speed being low relative to that normally experienced by other road users so as both to limit the rate of departure and make the vehicle more noticeable to other road users and the authorities, without risking it becoming stranded in a dangerous place.

The apparatus part may be arranged such that the speed limitation is a predetermined default setting that is overridden by the communication link with the authorized user to provide said normal operation not inhibited in this way, that is, it may take a fixed value, for example 25 Km/h (15 mph) that most drivers exceed where practicable. However, in congested urban areas traffic flow may occasionally be at a lesser speed. To this end, the vehicle may monitor the maximum or average speed within a time frame to compute a running average before and/or preferably after cessation of the communication link in order to derive a truer speed profile or function that is normal for the road conditions prevailing for the thief, so that after the delaying interval the speed is set to a fraction of the norm.

Insofar as other apparatus may be traceable through its continuing to function at some level, an analogous operating speed limit may be imposed to render the apparatus traceable while of little economic value to the taker.

Insofar as the authorization system may impose a variety of functional inhibitions on the apparatus at the end of the delaying interval it may also function to effect different degrees of inhibition to authorized users having different levels of authority. Thus the user part of the communication means may be programmable or be constructed to different forms to permit different levels or categories of authorization of specific apparatus.

Figure 6:
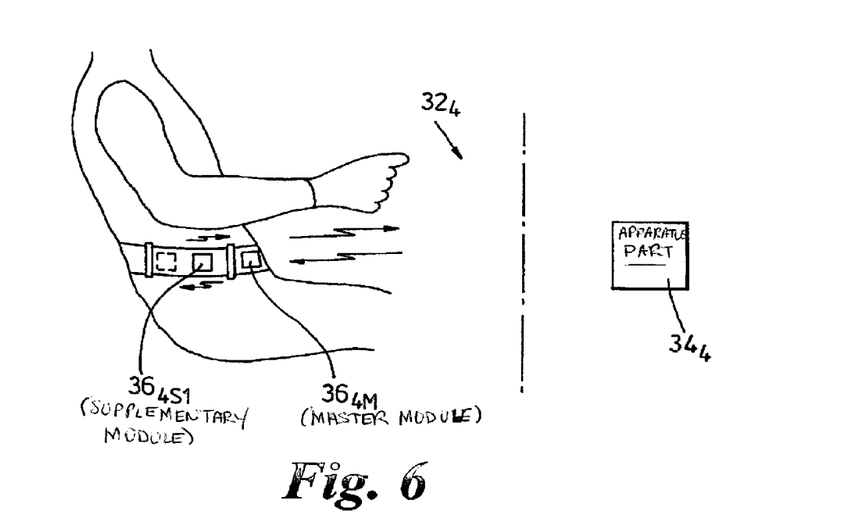
FIG. 6 is a schematic block circuit diagram of a fourth form of authorization system, generally similar to that of FIG. 4, but in which the communication means incorporates also a relay part in the communication link between the user and apparatus parts, and wherein the relay part comprises further functional apparatus.
Figure 7:
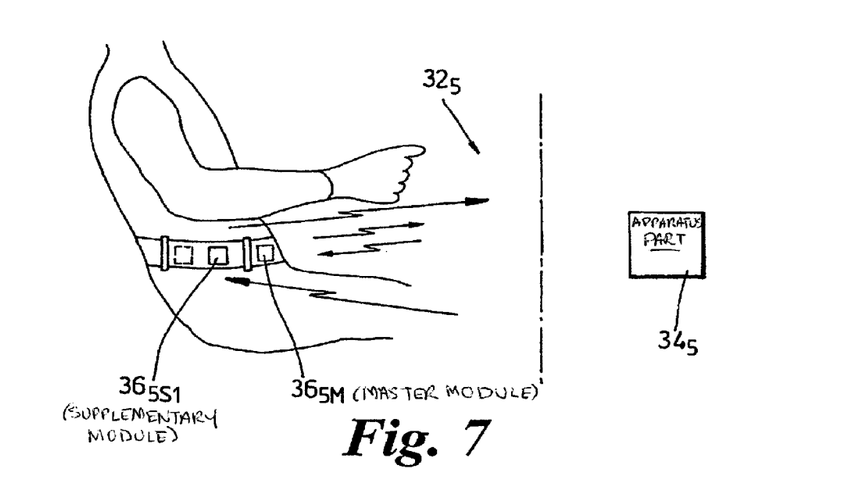
FIG. 7 is a schematic block circuit diagram of a fifth form of authorization system in which the user part of the communication means comprises, as discrete modules, a master module to effect the communication link with the apparatus part and upon interruption delayed inhibition of normal functioning, and one or more supplementary modules associated with optional additional functions of the apparatus which effect authorization thereof by way of communication links with the master module, the additional authorizations being in accordance with possession of appropriate supplementary modules, and, FIG. 8 is a schematic block circuit diagram of a sixth form of authorisation system in which the user part of the communication means comprises, as discrete modules, a master module to effect the communication link with the apparatus part and upon interruption delayed inhibition of normal functioning, and one or more supplementary modules, associated with optional supplementary functional features of the apparatus not critical to its normal functioning, which effect authorisation thereof by way of communication links with the apparatus part, the additional authorisations being in accordance with possession of appropriate supplementary modules.

However, in accordance with fourth and fifth embodiments of the invention shown in FIGS. 6 and 7 respectively, the user part comprises a plurality of discrete modules each of which is carried by an authorized user to have effect.

Referring to FIG. 6 shows in block a schematic form at $30_4$ a fourth embodiment of authorization system in accordance with the invention wherein the communication means $32_4$ comprises, in addition to the user and apparatus parts $36_4$ and $34_4$, corresponding to parts $36_2$ and $34_2$ described above. The user part $36_4$ comprises a master module $36_{4M}$ that performs the authorization of apparatus normal functioning as described above. There is also at least one supplementary module $36_{4S1}$ which authorizes a supplementary functional feature of the apparatus, say, the removal of a vehicle speed limit, to a user in position of it as well as the master module. The, or each, supplementary module is associated with a specific feature of the apparatus not critical to its normal function and is operable to effect a communication link with the master module in any of the ways described above for communication between user part and apparatus part, the communication means as a whole being responsive to absence of a communication link between a said supplementary module and master module to inhibit function of the associated feature within the functioning apparatus.

Alternatively, and as shown in FIG. 7 for a fifth embodiment of authorization system $32_5$, the user part $36_5$ comprises a master module $36_{5M}$ and at least one supplementary module $36_{5S1}$ etc. having associated therewith a specific supplementary functional feature of the functioning apparatus not critical to its normal functioning. This differs from the arrangement of FIG. 6 in that at least one supplementary module is operable to effect a supplementary communication link with the apparatus part rather than the master module and the communication means as a whole is responsive to absence of a communication link between a said supplementary module and the apparatus part to inhibit operation of the associated supplementary functional feature.

All of the above described embodiments comprises establishment of a communication link between a user part and apparatus parts of a pair directly to effect normal functioning of the apparatus.

As discussed above, it is preferred that the user part has minimum dimensions and thus has minimal on-board power storage capacity and low transmission power, insofar as the apparatus part is in general associated with a vehicle (or other apparatus) which is large enough to permit the apparatus part to accommodate within it, or be connected to, a power source of significant storage capacity. It is preferred to design the apparatus part for maximum sensitivity to reception of signals from low power user part transmissions and to maximise the apparatus transmission means power (if appropriate) to lessen any power burden on the user part.

Figure 8:
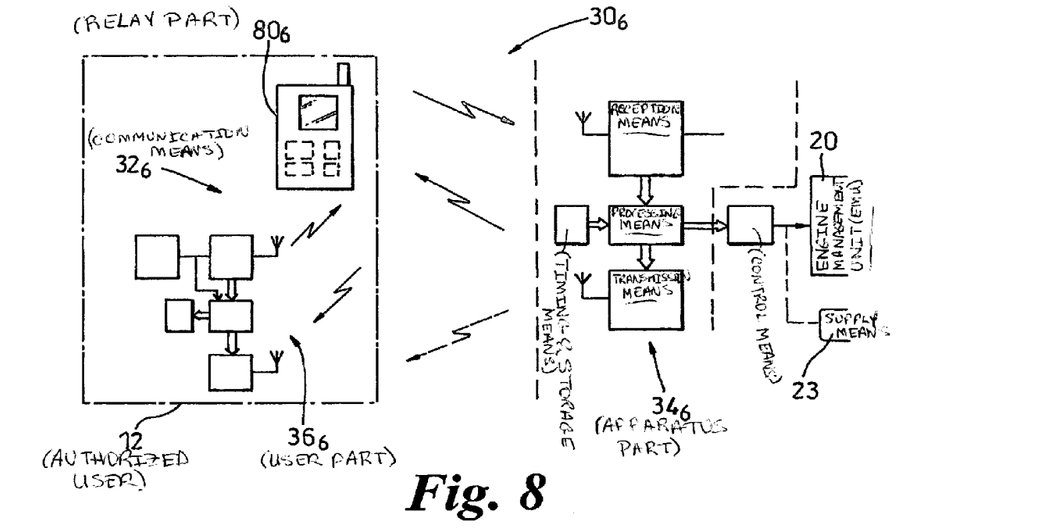

To further facilitate achievement of such desiderata for the user part, reference is made to FIG. 8 which shows in block a schematic form at $30_6$ a sixth embodiment of authorization system in accordance with the invention wherein the communication means $32_6$ comprises, in addition to the user and apparatus parts $36_6$ and $34_6$, corresponding to parts $36_2$ and $34_2$ described above, a relay part $80_6$ arranged to be disposed, in respect of the communication link, between the parts wherein at least the user part $36_6$, and preferably also the apparatus part $34_6$, is arranged to transfer identifying information by way of the relay part in preference to establishing a communication link directly.

As illustrated in the Figure, the relay part is arranged to be carried by the authorized user 12 in operation and may be less unobtrusive than the user part $36_6$ and including a more powerful a battery power supply and transmission means and, if appropriate, receiver means, for communicating over a distance with respect to the apparatus part that is long relative to the distance to the user part, thereby permitting the user part to be made even smaller and carried more unobtrusively.

The relay part is under the physical control of the authorized user and may advantageously comprise additional functioning apparatus, such as a cellular phone device, which inherently includes many of the components required of the relay part, and from which the user also runs the risk of being separated, not only when forcibly separated form the vehicle by a hijacker but also when the apparatus is carried by the user remotely from the vehicle.

The communication link is thus effected by transmission from the user part to the relay part and from the relay part to the apparatus part, so that if, having established such link by virtue of the relay-carrying authorized user correctly initiating functioning of the apparatus, any cessation of the link caused by either or both of the user and relay parts being separated from the apparatus part or each other causes delayed inhibition of vehicle functioning.

Although fundamentally it is only necessary for the relay part to be present in respect of transmissions from the user part to apparatus part, insofar as any link is bi-directional and carries identifying information unique to the transmission, it is preferred that the relay part encompasses full bi-directional communications with at least the user part, and many cellular phones are already enabled to communicate with local devices using the above-mentioned Bluetooth® technology. However, the communication means may be arranged such that notwithstanding the presence of a relay part, any communication link between user and apparatus parts is not contingent upon the presence of such relay part; that is, if the relay part is present and functioning then it is employed in establishing the communication link but if it is not present and functioning the apparatus and user parts nevertheless attempt to communicate directly. It will be appreciated that if appropriate the relay part may form part of the transmission path from the user part and apparatus part and for the apparatus part, with fewer power constraints, transmit directly with the user part.

It will be appreciated that a functioning cellular phone or the like which is normally carried on the person of the authorized user when away from the vehicle, may be disposed in the vicinity of, rather than on the person of, the authorized user when the latter is within the vehicle but may nevertheless be employed as such relay part without affecting functionality of both cellular phone and vehicle.

It will be furthermore appreciated that additional functioning apparatus suitable for use as the relay part may comprise a so-called hand-held or lap-top computer, watch or entertainment device, any of which may be carried by, and at risk of being taken from, an authorized user. Any such device is particularly suitable if, as mentioned above, it is enabled for wireless peer-to-peer networking using the Bluetooth® or like system. Such relay part may, of course, have no other function than to operate as a relay part.

It will also be appreciated that notwithstanding the above description of functional apparatus as being a vehicle and "additional" functioning apparatus as a relay part in forming a communication link therewith, such additional functioning and communicating apparatus as normally carried by the authorized user may constitute the functioning apparatus which is the authorization system is for, either in conjunction with it being such a relay part or alone. That is, such a cellular phone, computer, watch or the like which is normally carried in an enabled, functioning state by an authorized user may comprise apparatus part and form a communication link with a discreetly carried user part, directly or relayed through other such functioning apparatus, whereby separation of the authorized user from this or any functioning apparatus creates a delayed inhibition of its functioning. Depending upon the nature of the apparatus, mentioned above, the duration of the delay is chosen to permit the authorized user to become distanced from a robber of such apparatus. Furthermore, initiation of the delay may cause telephonically enabled apparatus to call a prescribed number with a prescribed message (possibly to the authorities or network administrator to cancel the subscription) and the inhibition of function may comprise permanent removal of functionality, such as destruction of a cellular phone network SIM card.

In addition to having movable functional apparatus taken from an authorized user by robbery, it is often the case that such authorized user puts down such functioning apparatus and leaves its vicinity, inadvertently exceeding the permissible working relationship. In many instances there is a significant difference between leaving apparatus which is not functioning and leaving apparatus which is, insofar as any key devices or equivalent codes or passwords have been applied and permit any unauthorized person to use its functions and, in many cases, extract information from it with or without removing the apparatus.

It will be understood that an analogous situation may apply to non-movable apparatus which nevertheless is caused to function by an operator/authorized user who may inadvertently exceed an acceptably permissible working distance and leave the functioning apparatus open to mis-use, including extracting contents, physical or intellectual. Thus in accordance with the present invention, whatever the functional apparatus, if the authorized user leaves the functioning apparatus to such extent that the spatial and/or temporal envelope is transgressed and communication link between them ceases, at least the apparatus ceases to function to the benefit of an unauthorized person. In a scenario where the authorized user is unlikely to be separated from the apparatus by robbery, the apparatus part may be sensibly arranged to abort delayed inhibition in response to re-establishment of communication link, so that this is transparent to the authorized user, or alternatively, require the authorized user to perform some partial or complete re-authorization as a deterrent to leaving the apparatus functioning. Furthermore, apparatus other than an automobile as described above may be configured to work with master and supplementary modules that enable a suitably authorized user, in possession of the relevant module or modules, to access functions not otherwise accessible beyond the basic functionality given by the master module.

The invention claimed is:

1. An authorization system for permitting functional control of an apparatus only in the presence of an authorized user, said system being provided distinct from normal key means authorizing the possessor of the key means to initiate the operation of said apparatus, the system comprising complementary parts of wireless communication means, which parts are arranged to be carried by the apparatus and by the authorized user, and are operable to effect a communication link, within a spatial envelope defining a predetermined permissible working relationship between the complementary parts, said communication link being defined by continual transfer with reference to a temporal envelope of identifying information comprising a rolling digital code based upon at least one random or pseudo-random number generated within the apparatus part and/or the user part and/or encrypted and decrypted in accordance with algorithms stored in said parts, said temporal envelope comprises a time window of predetermined duration in each of a plurality of sequential time intervals for pairing the complementary parts, said communication means effecting operative control of said apparatus in existence of said communication link, and said communication link being interrupted as the complementary parts are departed outside the spatial envelope, said complementary parts carried by the apparatus comprising means for inhibiting normal functioning of said apparatus during or after a delay interval on interruption of said communication link, whereas said delay interval is measured by acceleration responsive means and/or pedometer means which is representative to a predetermined distance travelled between the authorized user and the apparatus.

2. An authorization system as claimed in claim 1 wherein the apparatus is embodied in a vehicle having a cab and an engine, said cab being normally occupied by a driver, and wherein the spatial envelope is substantially co-extensive with the cab, and the apparatus part is arranged to form a communication link with a user part carried by the driver and to be operably coupled to the vehicle engine to authorize or inhibit functioning of the vehicle engine by the driver.

3. An authorization system as claimed in claim 2 wherein the apparatus or the communication means is arranged to be operably coupled to the vehicle engine to authorize the vehicle to travel at any speed demanded by the driver or to inhibit the vehicle from travelling in excess of a speed set by the system at the end of the delay interval.

4. An authorization system as claimed in claim 3 in which the apparatus or communication means part includes means for deriving a speed function related to any speed achieved during the delay interval and at the end of the delay interval to inhibit the vehicle from exceeding a speed that is a fraction of any speed represented by said speed function.

5. An authorization system as claimed in claim 1 adapted for permitting use of apparatus comprising a vehicle having its engine supplied with fuel by way of a fuel delivery system and the apparatus part of the system is arranged to be operably coupled to the vehicle to authorize or inhibit delivery of fuel to the engine and to effect said inhibition of normal functioning after a said delay interval by progressively reducing the delivery of fuel to the engine during said interval.

6. An authorization system as claimed in claim 1 adapted for use with apparatus in which operation of the apparatus is initiated by the operator prior to effecting control of functioning thereof, wherein the apparatus part is responsive to initiation of operation of the apparatus by the operator to initiate establishment of the communication link prior to, or contemporaneously with, functioning of the apparatus.

7. An authorization system as claimed in claim 1 in which the communication means comprises user transmission means carried by the user part and apparatus reception means carried by the apparatus part, having therein means to produce a first identity reference unique to the pair, the user transmission means being operable to transmit radiation modulated in accordance with said first identity reference and the apparatus reception means being responsive to receipt of said modulated radiation to confirm by transfer of identifying information including said first identity reference existence of a communication link between them.

8. An authorization system as claimed in claim 7 in which the communication means further comprises apparatus transmission means in the apparatus part and user reception means in the user part arranged to effect bi-directional communications between the apparatus part and the user part and the user and apparatus parts each have therein means to produce a second identity reference unique to the pair, the apparatus transmission means being operable to transmit radiation modulated in accordance with said second identity reference and the user reception means being responsive to receipt of said modulated radiation to confirm existence of a communication link between them.

9. An authorization system as claimed in claim 7 in which the communication means is arranged to change at least the carrier frequency of the modulated radiation in accordance with a digital code during communication.

10. An authorization system as claimed in claim 9 in which the communication means is arranged to effect a communication link in accordance with the Bluetooth wireless specification.

11. An authorization system as claimed in claim 1, the apparatus part being responsive to receipt of identifying information from the user part within each time window to provide authorization of the apparatus until the next time window and responsive to absence of identifying information to determine cessation of the communication link.

12. An authorization system as claimed in claim 11 in which the apparatus part is responsive to the absence of receipt of identifying information within a predetermined number of consecutive time windows to determine cessation of the communication link.

13. An authorization system as claimed in claim 11 in which the sequential communication intervals are contiguous.

14. An authorization system as claimed in claim 1 in which the communication means includes a relay part arranged to be disposed, in respect of the communication link, between the user part and apparatus part and wherein at least the user part is arranged to transfer identifying information by way of the relay part in preference to establishing a communication link with the apparatus part directly.

15. An authorization system as claimed in claim 14 in which the communication means is arranged to attempt to establish a communication link including the relay part and in absence thereof to establish a communication link directly between the user part and the apparatus part.

16. An authorization system as claimed in claim 14 in which the relay part is arranged to be carried by the user in operation.

17. An authorization system as claimed in claim 14 in which the relay part includes additional functional apparatus under the control of the authorized user and the relay part is arranged to effect in response to cessation of an existing communication link with the user part of the communication means during functioning of the additional apparatus inhibition of normal functioning after a delaying interval.

18. An authorization system as claimed in claim 1 in which the user part comprises a plurality of physically discrete modules comprising a master module operable to effect a said communication link with the apparatus part and at least one supplementary module operable to effect a communication link with the master module, each said supplementary module having associated therewith a specific functional feature of the functioning apparatus, said communication means being responsive to absence of a communication link between a said supplementary module and master module to inhibit function of said feature within the functioning apparatus.

19. An authorization system as claimed in claim 1 in which the user part comprises a plurality of physically discrete modules comprising a master module operable to effect a said communication link with the apparatus part and at least one supplementary module operable to effect a supplementary communication link with the apparatus part, each said supplementary module having associated therewith a specific supplementary functional feature of the functioning apparatus not critical to its normal functioning, said communication means being responsive to absence of a communication link between a said supplementary module and the apparatus part to inhibit operation of the associated supplementary functional feature.

20. An authorization system as claimed claim 1 in which the apparatus part of the communication means is arranged to be removably carried by the apparatus in functioning and includes apparatus operation initiation means operable to permit initial operation of the apparatus.

21. An authorization system as claimed in claim 1 for apparatus having a telephone communication ability, in which the apparatus part is operable during said delay interval to effect a telephone call to a predetermined recipient.

22. An authorization system as claimed in claim 1 adapted for use with moveable apparatus susceptible to being taken from the possession of the authorized user whilst functioning, in which the apparatus or the communication means includes means for measuring distance travelled and the communication means is operable to effect the delay interval as a function of distance travelled by the apparatus.

23. An authorization system as claimed in claim 1 in which the acceleration responsive means is responsive to movement of the apparatus or communication means to effect a determination of distance travelled by the apparatus at least during the delay interval.

24. An authorization system as claimed in claim 23 for use with moveable apparatus capable of being carried by, and susceptible of being taken from the possession of the authorized user, wherein the pedometer means is operable to recognize movement steps of the carrier of the apparatus and to compute from a number of recognized steps at least an approximate distance travelled by the apparatus.

25. An authorization system as claimed in claim 24 in which the pedometer means includes calibration means arranged to calibrate the pedometer means to the stride pattern of the authorized user and the apparatus includes means to provide to the authorized user on demand distance travelled by apparatus carried by the authorized user during normal functioning of the apparatus.

26. An authorization system as claimed in claim 1 adapted for use with moveable apparatus susceptible to being taken from the possession of the authorized user whilst functioning, in which the apparatus or the communication means includes means for measuring speed of the apparatus and at least one of the time and distance of travel of the apparatus and the communication means is operable to effect the delay interval as a function of said speed and at least one of said time and distance of travel of the apparatus during the delay interval.

27. An authorization system as claimed in claim 1 in which the apparatus or the communication means includes timing means and the communication means is operable to effect the delay interval as a time delay.

28. An authorization system as claimed in claim 1 in which the apparatus part is operable in the delay interval to effect temporary or permanent inhibition of multiple functional aspects of the apparatus during said delay interval to disguise responsibility of any particular functional aspect for non-functioning of the apparatus.

* * * * *